US011639010B2

(12) United States Patent
Geelhoed

(10) Patent No.: US 11,639,010 B2
(45) Date of Patent: May 2, 2023

(54) ELECTRON BEAM TREATMENT FOR INVASIVE PESTS

(71) Applicant: Fermi Research Alliance, LLC, Batavia, IL (US)

(72) Inventor: Michael Geelhoed, Batavia, IL (US)

(73) Assignee: FERMI RESEARCH ALLIANCE, LLC, Batavia, IL (US)

( * ) Notice: Subject to any disclaimer, the term of this patent is extended or adjusted under 35 U.S.C. 154(b) by 323 days.

(21) Appl. No.: 16/923,059

(22) Filed: Jul. 7, 2020

(65) Prior Publication Data
US 2021/0008756 A1 Jan. 14, 2021

Related U.S. Application Data

(60) Provisional application No. 62/871,644, filed on Jul. 8, 2019.

(51) Int. Cl.
| | | |
|---|---|---|
| *G01K 3/00* | (2006.01) |
| *B27K 5/00* | (2006.01) |
| *A01M 1/22* | (2006.01) |
| *G01K 3/10* | (2006.01) |

(52) U.S. Cl.
CPC ........... *B27K 5/0035* (2013.01); *A01M 1/226* (2013.01); *G01K 3/10* (2013.01)

(58) Field of Classification Search
CPC ........ B27K 5/0035; A01M 1/226; G01K 3/10
USPC ......................................................... 162/50
See application file for complete search history.

(56) References Cited

U.S. PATENT DOCUMENTS

| | | | |
|---|---|---|---|
| 4,005,894 A * | 2/1977 | Tucek | ....................... B66C 3/16 414/733 |
| 6,172,463 B1 | 1/2001 | Cutler et al. | |
| 6,713,540 B2 | 3/2004 | Rached et al. | |
| 6,753,478 B2 | 6/2004 | Rodway et al. | |
| 7,089,685 B2 | 8/2006 | Torgovnikov et al. | |
| 7,140,771 B2 | 11/2006 | Leek | |
| 7,837,932 B2 | 11/2010 | Hedman | |
| 7,932,065 B2 | 4/2011 | Medoff | |
| 8,159,158 B2 | 4/2012 | Popovic | |
| 8,198,350 B2 | 6/2012 | Fee et al. | |
| 8,277,738 B2 | 10/2012 | Kim et al. | |
| 8,389,642 B2 | 3/2013 | Goto et al. | |

(Continued)

OTHER PUBLICATIONS

Allen et al. "Phytosanitary measures to reduce the movement of forest pests with the international trade of wood products." Biological Invasions, vol. 19, pp. 3365-3376 (Jul. 22, 2017).

(Continued)

*Primary Examiner* — Daniel A Hess
(74) *Attorney, Agent, or Firm* — Loza & Loza LLP; Kevin L. Soules

(57) ABSTRACT

A system and method for the treatment of invasive pests includes an irradiation device that can generate an electron beam that is applicable to a tree infected by an invasive pest, wherein the electron beam provides an in-situ treatment for the tree infected by the invasive pest by killing the invasive pest via electron beam irradiation. One or more temperature sensors can be used to track the internal temperature of a tree surrogate. A differential temperature difference tracked by temperature sensor can be used to ensure that a reduction in temperature of the tree is attributable to the electron beam rather than increase in heat.

19 Claims, 11 Drawing Sheets

(56) References Cited

U.S. PATENT DOCUMENTS

| | | |
|---|---|---|
| 8,674,630 B1 | 3/2014 | Cornelius |
| 8,779,697 B2 | 7/2014 | Baurichter et al. |
| 9,186,645 B2 | 11/2015 | Kephart |
| 9,340,931 B2 | 5/2016 | Kephart |
| 9,398,681 B2 | 7/2016 | Tantawi et al. |
| 10,070,509 B2 | 9/2018 | Kephart |
| 10,190,118 B2 | 1/2019 | Ward et al. |
| 10,390,419 B2 | 8/2019 | Kephart |
| 2003/0164285 A1* | 9/2003 | Korenev ............ A61L 2/081 422/186 |
| 2003/0215354 A1 | 11/2003 | Clark et al. |
| 2004/0085096 A1 | 5/2004 | Ward et al. |
| 2008/0068112 A1 | 3/2008 | Yu et al. |
| 2008/0251156 A1* | 10/2008 | Kang ............... A01M 1/226 144/335 |
| 2011/0081553 A1 | 4/2011 | Mehlmann et al. |
| 2012/0295048 A1 | 11/2012 | Al-Malaika et al. |
| 2012/0326636 A1 | 12/2012 | Eaton et al. |
| 2013/0316087 A1 | 11/2013 | Ahn et al. |
| 2014/0090291 A1* | 4/2014 | Eldesouk ............ A01G 17/00 43/124 |
| 2014/0270955 A1 | 9/2014 | Coe |
| 2014/0284495 A1 | 9/2014 | Medoff et al. |
| 2016/0035531 A1 | 2/2016 | Lunin et al. |

OTHER PUBLICATIONS

Arborjet. "Trunk Injection Fact Sheet." Insecticide Options for Protecting Ash Trees from Emerald Ash Borer. Joint Research Summary by Ohio State Univ. et al. (2009).

Cook et al. "Timber harvest methods." Michigan State Univ. Extension (Sep. 4, 2014).

Dyck et al. "Sterile insect technique. Principles and practice in area-wide integrated pest management." Springer, 799 pp. (2005).

FAO.2019 Glossary of phytosanitary terms. International Standard for Phytosanitary Measures No. 5. Rome. P ublished by FAO on behalf of the Secretariat of the International Plant Protection Convention (IPPC). 35 pp. Licence: CC BY-NC-SA 3.0 IGO (2019).

Hallman. "Expanding radiation quarantine treatments beyond fruit flies." Agriculture and Forest Entomology 2, 35-95 (2000).

McCullough et al. "Effects of chipping, grinding, and heat on survival of emerald ash borer, Agrilus planipennis (Coleoptera: Buprestidae), in Chips." Journal of Economic Entomology, vol. 100, Issue 4, pp. 1304-1315 (Aug. 1, 2007).

Spector. "Local governments are paying the price for global trade's effects on trees." Bloomberg City Lab (Apr. 25, 2016).

Spector. "What it would take to stop invasive pests from destroying millions of U.S. trees." Bloomberg City Lab (May 10, 2016).

Wessels-Berk et al. "One beetle too many: the emerald ashash-borer, Agrilus planipennis (Coleoptera Buprestidae), threatens Fraxinus trees in Europe." Proc. Neth. Entomol. Soc. Meet. vol. 19, pp. 165-168 (2008).

* cited by examiner

ELECTRON BEAM TREATMENT FOR INVASIVE PESTS

CROSS REFERENCE TO RELATED PATENT APPLICATIONS

The present application claims the priority and benefit under 35 U.S.C. § 119(e) of U.S. Provisional Patent Application Ser. No. 62/871,644 filed Jul. 8, 2019, entitled "ELECTRON BEAM TREATMENT FOR INVASIVE PESTS." U.S. Provisional Patent Application Ser. No. 62/871,644 is herein incorporated by reference in its entirety.

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

The embodiments are generally related to the field of irradiation devices including electron beam accelerators. Embodiments further relate to the field of invasive pest control and the use of ionizing radiation in treating trees and wood infected by invasive pests.

BACKGROUND

In its broadest sense, a pest refers to any organism that negatively affects a plant and/or animal host organism by colonizing, damaging, attacking, or competing with the host for nutrients or habitat, or directly or indirectly infecting a host organism causing the host's disease or death.

Pests are detrimental, destructive, and troublesome because they adversely affect many human concerns such as public health, ecology, and the economy. For example, infestations of pests: 1) spread pathogens or are themselves pathogenic vectors, causing disease and epidemic outbreaks; 2) decrease agriculture and livestock production by reducing yields and quality; 3) increase risks of structural damage by weakening the physical integrity of buildings, bridges and other man-made structures; and 4) disrupt and ruin native ecosystems by overtaking the habitat of indigenous species. Annually, the worldwide cost associated with pest infestations exceed tens of billions of dollars. These staggering economic losses are directly attributable to such infestations, and do not include the expense associated with keeping pest populations under control.

For years, invasive pests infiltrating the United States have wrought havoc on the food and agriculture industries. Invasive species and pests have caused particular hardships on agriculture throughout the United States and other countries. Such pests include, but are not limited to, insects such as Gypsy Moths, Emerald Ash Borers, Asian Longhorned Beetles, and Spotted Lanternflies. These pests, and others, are associated with diseases such as Boxwood Blight and Sudden Oak Death.

The loss of resources impacts the nation's food and agriculture industries. Millions of dollars worth of losses by local and state governments, as well as the federal government, have been incurred by taxpayers. One approach to limit the damage caused by pests are import and export laws. These approaches help contain pest proliferation, but also limit economic opportunities.

Prior art approaches to dealing with invasive pests include quarantine and mitigation. The quarantine method is a means to prevent and/or reduce the pests' range and, by extension, spread to new places. Mitigation methods also exist, which include heat treatment and chemical fumigation, among others. These methods in practice are not always cost effective or may consume valuable forestry and plant commodities, and the loss of potential revenue is impactful to the industry.

Pests such as the Emerald Asian Borer (EAB), the Asian Longhorned Beetle, and others, have particularly impacted agriculture. These pests have forced numerous states to divide counties into quarantine zones. This has reduced production resources for industries such as furniture manufacturing, construction materials, and others. Infected trees are simply written off as a loss.

Pest pathways associated with invasive pests has been documented in the import of goods from across the world. A total of 25 million shipping containers a year come into the United States. Trade in wood products has been increasing over the years. Total global exports of agricultural commodities in 2014 was $1.7 trillion US dollars.

The majority of this takes the form of round wood and sawn wood. Round wood is mainly moved for subsequent processing at a destination, while sawn wood is used in building construction and furniture manufacturing among other uses. 63% of US forests are now at risk of losing trees to invasive pests. FIG. 1 shows a map 100 of current U.S. counties where EAB infestations have been documented.

Procedures for reducing pest introduction and spread are termed "Phytosanitation measures." These procedures include heat treatment, kiln drying, air drying, fumigation, chemical treatment, and others. Chemical treatments reduce the risk of the invasive pests by directly injecting formulations into the trunk of a tree. This protection can last for a couple of years at a cost of approximately $53 per treatment. Heat treatments are also possible but suffer from energy efficiency restrictions. All such methods also have logistical issues, are time consuming, and are not cost effective.

The simplest solution is quarantine. While this method slows the spread of invasive pests it does not prevent it. Furthermore, dead trees still impose a cost, since they will eventually have to be removed to mitigate threats to people and property. Ultimately, most of the cost of invasive pests is shouldered by local governments. All told the total cost to local governments and private homeowners is broken down into extra expenses of tree removal and depreciated property values, summing to in excess of $2.5 Billion per year.

As such, there is an increasing need for systems and methods that provide safe, cost effective measures for phytosanitation. Systems and methods which address this need can include exposing infested wood commodities to ionizing radiation to eradicate invasive pests as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for an improved system and method for treating trees and wood infected by invasive pests.

It is another aspect of the disclosed embodiments to provide for the in-situ treatment of trees infected with an invasive pests, utilizing an irradiation source.

The aforementioned aspects and other objectives and advantages can now be achieved as described herein. In an embodiment, a system and method for the treatment of invasive pests can include an irradiation device that can generate an electron beam that is applicable to a tree infected by an invasive pest, wherein the electron beam provides an in-situ treatment for the tree infected by the invasive pest by killing the invasive pest via electron beam irradiation. One or more temperature sensors can be used to track the internal temperature of a tree surrogate. A differential temperature difference tracked by the temperature sensor can be used to ensure that a reduction in temperature of the tree is attributable to the electron beam rather than increase in heat.

For example, a method for the treatment of invasive pests, comprises generating an electron beam with an irradiation device and applying the electron beam to a tree, wherein the electron beam provides an in-situ treatment for the tree. In an embodiment, the electron beam generated by the irradiation device comprises a 9 MeV electron beam. In an embodiment the method further comprises tracking an internal temperature of at least one tree surrogate with at least one temperature sensor and determining a differential temperature difference from data tracked by the at least one temperature sensor, wherein the differential temperature difference is used to ensure that a reduction in a temperature associated with the tree is attributable to the electron beam. In an embodiment, the method further comprises rotating the tree as the electron beam is applied to the tree and pulling the irradiation device along the longitudinal axis of the tree.

In an embodiment, the irradiation device comprises a portable irradiation device. The irradiation device comprises a portable electron beam accelerator. The power of the electron beam is adjustable.

In another embodiment, a system for treating pests comprises an irradiation device configured to generate a particle beam, a log bay with at least two log rollers formed in the log bay, a shielding platform configured to hold the irradiation device over the log bay, and a computer system configured to control the irradiation device and the speed of the at least two log rollers. In an embodiment, the irradiation device comprises a portable electron beam device configured to generate an electron beam. In an embodiment, an aperture is formed in the shield platform through which the particle beam passes.

In an embodiment, the system further includes a second log bay with at least two log rollers formed in the second log bay and a pick and place log assembly configured to place logs in the log bay and the second log bay. In an embodiment, the pick and place log assembly comprises a retractable neck and jaws for securing a log.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
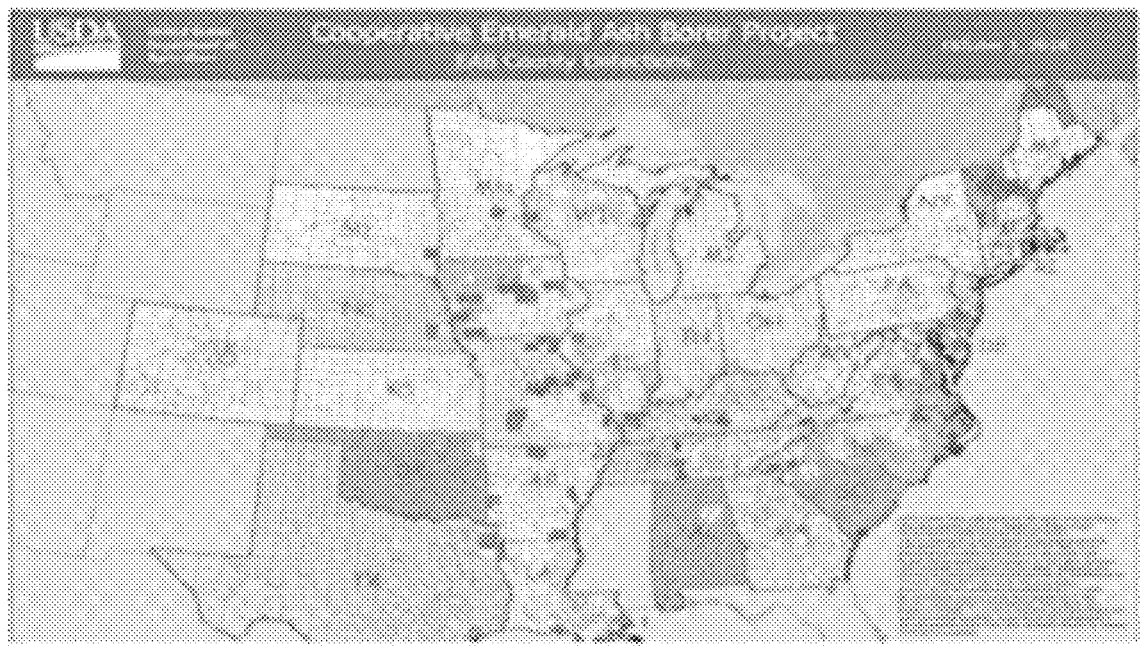
FIG. 1 illustrates a map of countries with EAB detections.

The particular values and configurations discussed in the following non-limiting examples can be varied, and are cited merely to illustrate one or more embodiments, and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein. Rather, these embodiments are provided so that this disclosure will be thorough and complete, and will fully convey the scope of the embodiments to those skilled in the art. Like reference numerals refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," a used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "In another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations. The principal features can be employed in various embodiments without departing from the scope disclosed herein. Those skilled in the art will recognize, or be able to ascertain, using no more than routine experimentation, numerous equivalents to the specific procedures described herein. Such equivalents are considered to be within the scope of the disclosed embodiments and are covered by the claims.

The use of the word "a" or "an" when used in conjunction with the term "comprising in the claims and/or the specification may mean "one," but it is also consistent with the meaning of "one or more," at "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of "having," such as "have" and "has"), "including" (and any form of "including," such as "includes" and "include") or "containing" (and any form of "containing," such as "contains" and "contain") are inclusive or open-ended and do not exclude additional, un-recited elements or method steps.

All of the compositions and/or methods disclosed and claimed herein can be made and executed without undue experimentation in light of the present disclosure. While the compositions and methods have been described in terms of preferred embodiments, it will be apparent to those of skill in the art that variations may be applied to the compositions and/or methods and in the steps, or in the sequence of steps, of the method described herein without departing from the concept, spirit and scope of the disclosed embodiments. All such similar substitutes and modifications apparent to those skilled in the art are deemed to be within the spirit, scope and concept as defined by the appended claims.

The disclosed systems and methods are directed to treatment of substrates infested by invasive pests. In an exemplary embodiment, an irradiation device such as a portable electron beam accelerator can generate an electron beam that can be applied to a tree (or wood) infested by an invasive pest, wherein the electron beam provides an in-situ treatment of the tree, by killing the invasive pest via electron beam irradiation. One or more temperature sensors can be used to track the internal temperature of a tree surrogate. A differential temperature difference, tracked by the temperature sensor, can be used to ensure that a reduction in temperature of the tree is attributable to the electron beam rather than increase in heat. Note that as utilized herein the term "tree," in addition to referring to a live tree, can also refer to wood, logs, or other wood products, which may have also been infested, or are suspected to have been infested, by an invasive pest.

A key aspect of the disclosed embodiments is the achievable depth of penetration, which can be controlled. The depth of penetration of an electron beam can be determined by the energy of the electron. For example, electron penetration depth in this energy range is given by $R$ (g/cm$^2$)=0.530T−0.106. A typical 9 MeV electron has a 4.6 g/cm$^2$ depth of penetration. Since a tree has a density of 0.8 g/cm$^3$, the true depth of penetration is about 5.75 cm. With this depth, electron particles have the necessary depth penetration range to interact with the eggs and larvae of an invasive pest, such as the Emerald Ash Borer, if they are buried 2.25 inches into the tree.

Conventional particle accelerators have been used in industrial applications since the 1950s. However, these accelerators use conventional copper cavities. These cavities are inefficient because they generate a tremendous amount of heat instead of transferring energy to accelerated electrons. Furthermore, they are generally very larger and immobile. In such devices, the source of power to the electrons is generated by radiofrequency waves internal to the cavity of the accelerator. Technology advances have resulted in systematic improvements in reliability and efficiency for RF sources.

The next generation electron beam accelerators include features that allow the electron beam power to be tailored to a specific application. The size of these accelerators has also decreased substantially and they have become more energy efficient. An example of an electron beam accelerator that ca be used as an irradiation device in accordance with the disclosed systems and methods is disclosed in U.S. Pat. No. 9,642,239 entitled "Conduction Cooling Systems for Linear Accelerator Cavities" which issued to Robert Kephart on May 2, 2017. Another example of an electron beam accelerator that can be utilized as an irradiation device in accordance with the disclosed systems and methods is disclosed in U.S. Pat. No. 10,070,509 entitled "Compact SRF Based Accelerator", which issued to Robert Kephart on Sep. 4, 2018. Note that U.S. Pat. Nos. 9,642,239 and 10,070,509 are incorporated herein by reference in their entirety and are assigned to Fermi Research Alliance, LLC.

Figure 2:
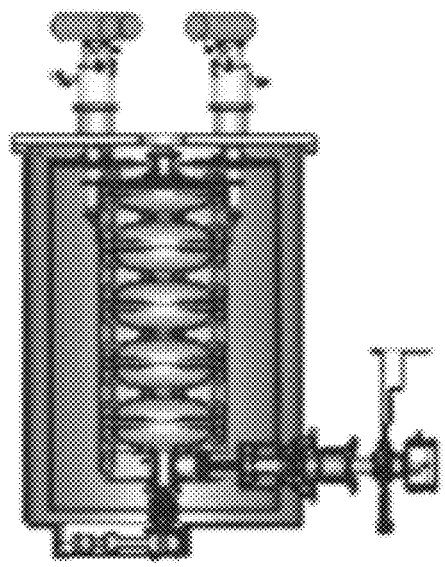
FIG. 2 illustrates an example of an irradiation device comprising an electron beam accelerator, in accordance with features of the embodiments.

FIG. 2, illustrates an irradiation device 200, which utilizes superconducting materials and advanced RF power sources among other features, and can be used to generate electron beams as disclosed herein. The irradiation device is portable and can provide a cost effective solution for generating the required beam power.

Ionizing radiation can be used to treat wood products by first, killing any pests living in the wood, and in addition treating eggs or larva in the wood, effectively preventing the next generation of invasive pests from surviving. An average sterilization dose can range from 43 to 200 Gy, which can effectively treat most such pests. In order to ensure efficacy, a conservative approach can include delivering twice the required dose in certain embodiments.

To apply the appropriate dose, quantity of dose matters. However, applying the dose in the correct location on the wood and during the correct life cycle of the pest can improve the efficacy of the method. For example, the larvae of the EAB species are tunnel borers, meaning they bore in, and grow inside, tunnels in plant material. For the Emerald Ash Borer, prime habitat is the wood of an ash tree. It should be appreciated that reference herein to the Emerald Ash Borer (EAB) and other types of invasive pests is presented for illustrative purposes only and such specific pests are not considered limiting features of the disclosed embodiments.

Figure 3:
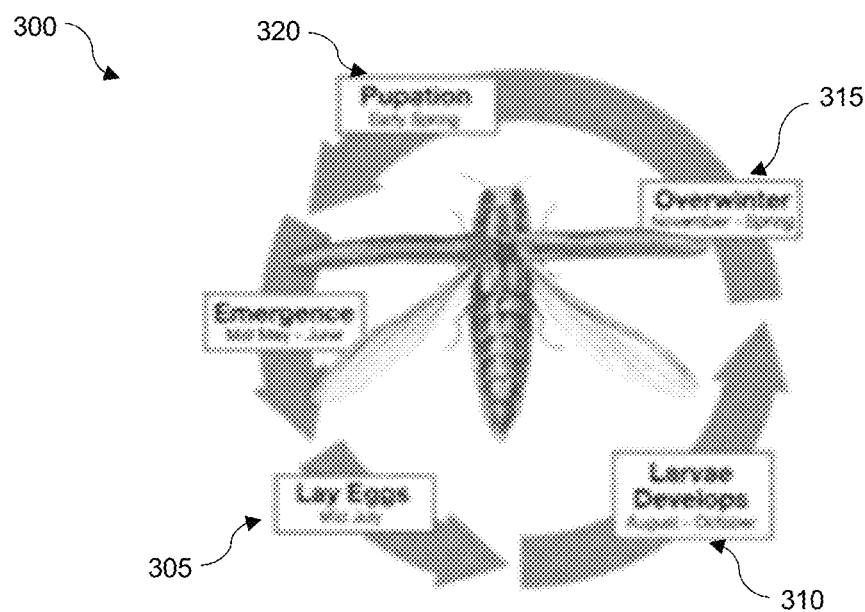
FIG. 3 illustrates a diagram demonstrating the lifecycle of an EAB, in accordance with features of the embodiments.

FIG. 3 illustrates a diagram 300 demonstrating the lifecycle of an EAB, in accordance with an embodiment. As shown in FIG. 3, females may lay eggs on the bark of a host tree in the summer as shown at 305. Next, the larvae develop in the wood between the bark and the sapwood as shown at 310. The larvae create serpentine paths in the wood. The larvae live in the paths over winter as shown at 315 until pupation at 320 occurs in early spring. By late spring the adult EAB will emerge from the tunnel as shown at 325. As additional paths are created by the EAB in the wood, they eventually become disruptive to the flow of nutrients in the tree and will eventually kill the tree.

However, prior to the larvae development stage 310 of the lifecycle, if infected trees undergo an electron beam treatment of, for example, 400 Gy with the disclosed irradiation device, the eggs and larvae will not survive the development stage 310. Thus, the most advantageous time for treatment is in the midsummer to early fall when trees are harvested. Specifically, after these infected trees are harvested, but prior to shipment for processing, the trees can go through a mobile electron beam treatment system as described herein.

Figure 4:
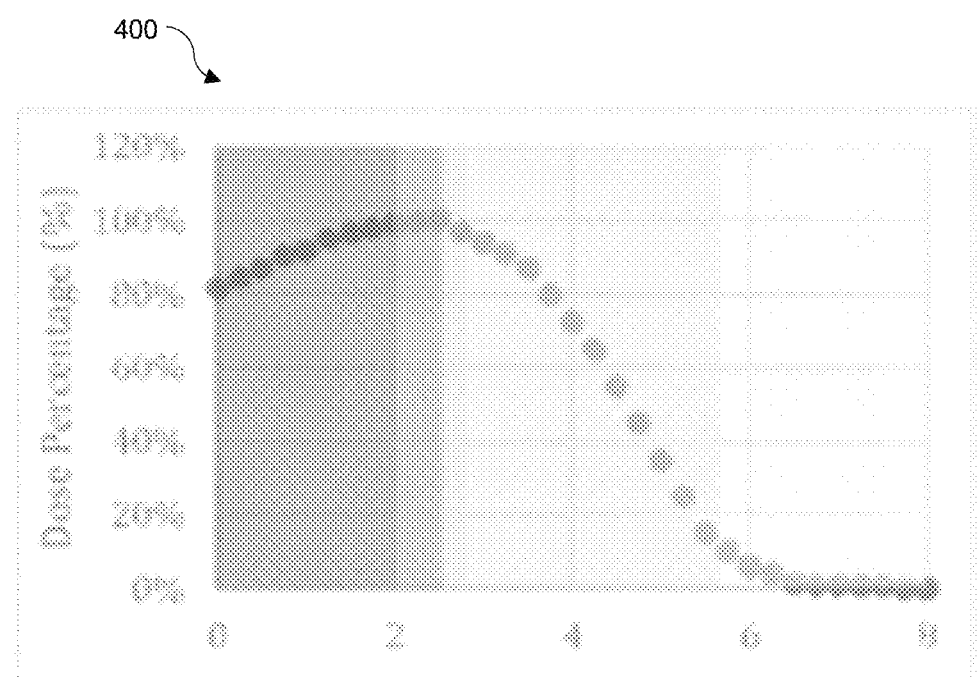
FIG. 4 illustrates a graph depicting data indicative of dose depth penetration for a 9 MeV electron beam on a tree, in accordance with features of the embodiments.

FIG. 4 illustrates a graph 400 depicting data indicative of depth of dose penetration for 9 MeV electronics into a tree, in accordance with an embodiment. It can be appreciated the technology of the disclosed irradiation device (including an electron beam accelerator) can be used to tailor the beam power by adjusting the accelerator cavity's gradient. The electron gun can also be selected and/or adjusted for the beam power requirements as necessary.

Since the size of trees is not as consistent as, for example, a production line of the commodities they produce, developing an adjustable electron beam application setup is key to successful treatment.

Figure 5:
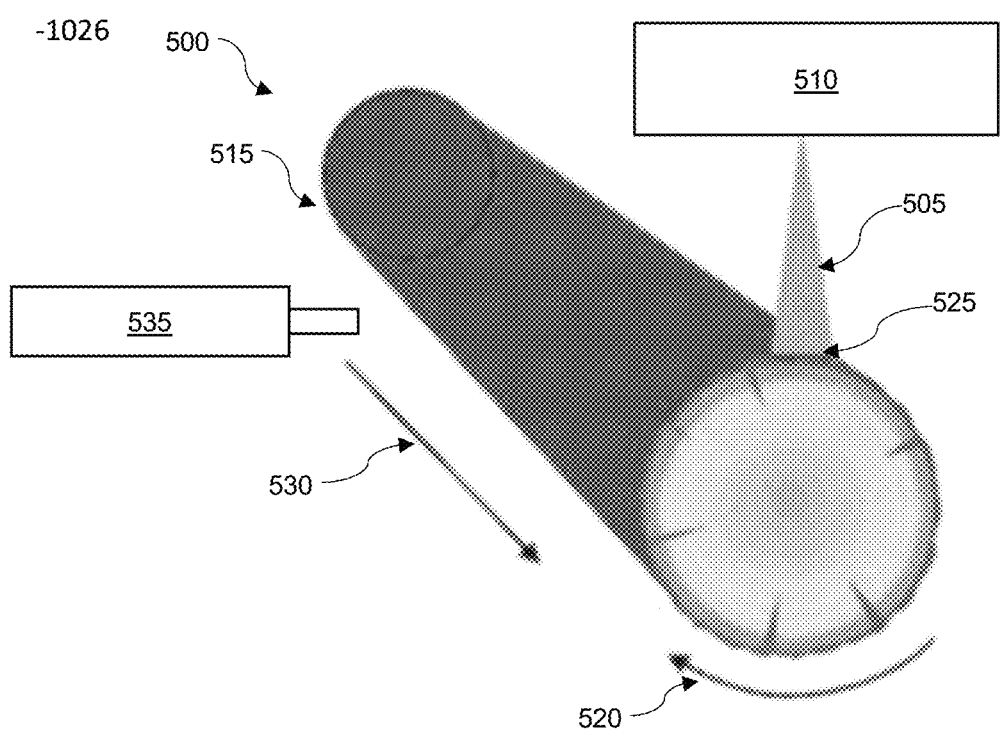
FIG. 5 illustrates a diagram depicting the spiral application of an electron beam with respect to a log, in accordance with features of the embodiments.

FIG. 5 illustrates a diagram 500 depicting the spiral application of an electron beam 505 produced by an portable accelerator 510, with respect to an exemplary log 515, such an ash tree log, in accordance with an embodiment. If the ash tree log 515, for example, has a diameter of 30 cm and a length of 8 meters, with a standard density, the mass of the treatment volume is 210 kg worth of wood. As such, a log 515 of this length can be spun, with a spinning roller, as illustrated by arrow 520, while a traversing electron beam 505 is applied. Over the course of a four minute application, the exemplary arrangement can meet a throughput demand of 1.74 kg/sec. The beam power requirement for a log with these dimensions, using an accelerator 510 comprising a 9 MeV electron accelerator, will be less than 1 kW.

To cover the entire surface area of the log 515 with the exemplary dimensions mentioned above, a beam spot 525 can be identified. A 3 cm beam spot 525 size can be sufficiently overlapped to create numerous sections along the length of the log 515. The rotational speed can be as low as 2.3 mph while the pull speed can also be as low as 0.06 mph, in order to cover all sections of the log 515.

A temperature sensor 535 can track an internal temperature of at least one tree surrogate, such that a differential temperature difference tracked by the at least one temperature sensor is used to ensure that a reduction in a temperature associated with the tree is attributable to the electron beam rather than an increase in heat The rotation 520 can be controlled by spinning rollers on variable drives, while the pull speed shown by arrow 530 can be provided by a log conveyor belt system. Ultimately this can function as an electron beam "car wash" style treatment for logs.

For the reference log 515, a portable accelerator system 510 may require $30/hr. of operating cost, equating to a processing cost of, for example, $2/tree. With the value of a log of varying worth, the net benefit can be determined by the quality of the wood. For reference, other treatment process costs are significantly more expensive. Insecticide spraying may cost $35 per year, while cutting and replacing may cost $625. In some cases, removing residential trees may cost $1,500 or more.

Figure 6:
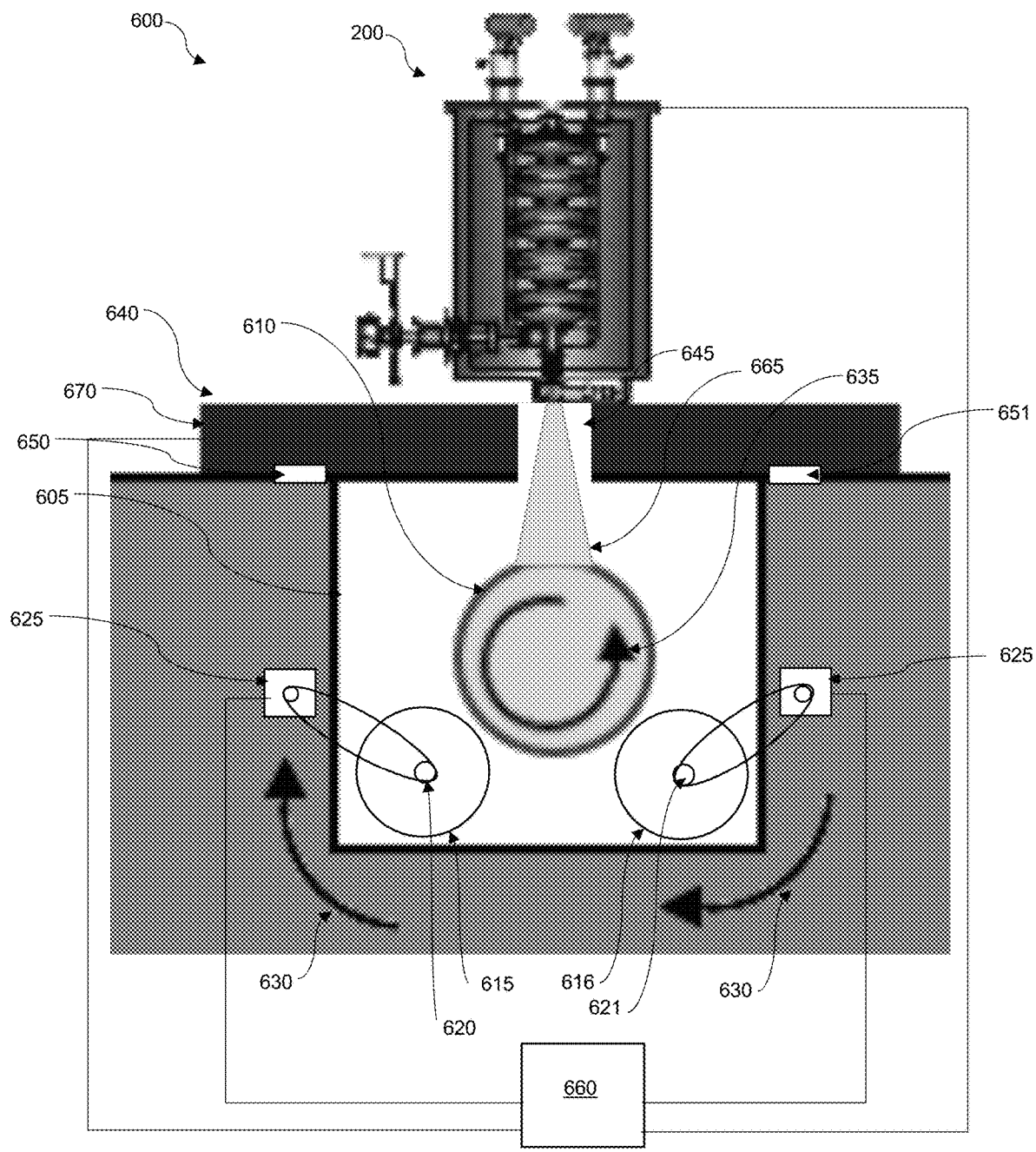
FIG. 6 illustrates a diagram of a log treatment system, in accordance with features of the disclosed embodiments.

FIG. 6 illustrates an embodiment of a log treatment system 600 in accordance with the disclosed embodiments. The log treatment system 600 generally comprises a log bay 605 which can be configured as a trough formed in a facility floor, or other such container. The log bay 605 could, for example, also be a trough formed in a trailer, or other such mobile container. The log bay 605 can be sized to fit a log, such as log 610, and thus may be much longer than it is wide or deep.

The log bay 605 can further comprise two parallel log rollers, log roller 615 and log roller 616. The log rollers 615 and 616 can comprise cylindrical supports that run the length, or some proportion of the length, of the log bay 605. Each of the log rollers 615 and 616 can be configured with a drive shaft 620 and drive shaft 621 respectively. The drive shafts are in turn connected to one or more motors 625. The motor(s) 625 are configured to impart rotational motion on the drive shafts 620 and 621, which in turn, drives rotation of the log rollers 615 and 616.

The log rollers 615 and 616 can be configured to spin in either a clockwise or counterclockwise direction. As illustrated in FIG. 6, if the log rollers spin in a clockwise direction as shown by arrows 630 and 631, the log 610 will be forced to spin in a counter clockwise direction as shown by arrow 635.

The system 600 can further include a shielding platform 640. The shielding platform 640 can be configured to house an accelerator, such as accelerator 200. The shielding platform 640 can further be configured with shielding 670, which is designed to shield the facility from the particle beam. The accelerator 200 can thus be mounted on the shielding platform 640. An aperture 645 can be formed in the shielding platform 640 to allow a particle beam 665 to interact with the log 610 in the log bay 605.

The shielding platform 640 can be fitted with a rail 650 on one side and a rail 651 on the other side. The rails 650 and 651 allow the shielding platform to be driven by a motor (not shown) along the length of the log bay 605.

The system can further include a computer system 660 that can be used to control various aspects of the system. Computer system 660 can comprise some or all of the aspects illustrated in FIGS. 10-12. Specifically, the rotational speed of the log 610, the beam power of the particle beam 665, and the longitudinal motion of the shielding platform 640 all contribute to the total dose per unit volume of the log 610. In certain embodiments, the computer system 660 can include a user interface that allows the user to set parameters including log dimensions (length, diameter, density, etc.), log rotation speed, beam power, longitudinal speed of the shielding platform, and number of passes in order to achieve the desired dosage per unit volume of the log. In other embodiments, the user interface can include a field that allows the user to set the desired dosage to a value. The user may also enter a time parameter indicating the total treatment time available for the log. The computer system can then use the values input to control the rotational speed of the log, the power of the beam, the lateral speed of the shielding platform, and the number of passes of the shielding platform over the log to ensure the log is properly dosed. In certain embodiments, the computer can further adjust the associated parameters to provide maximum energy efficiency according to the time scale and required dose provided to the computer.

Figure 7:
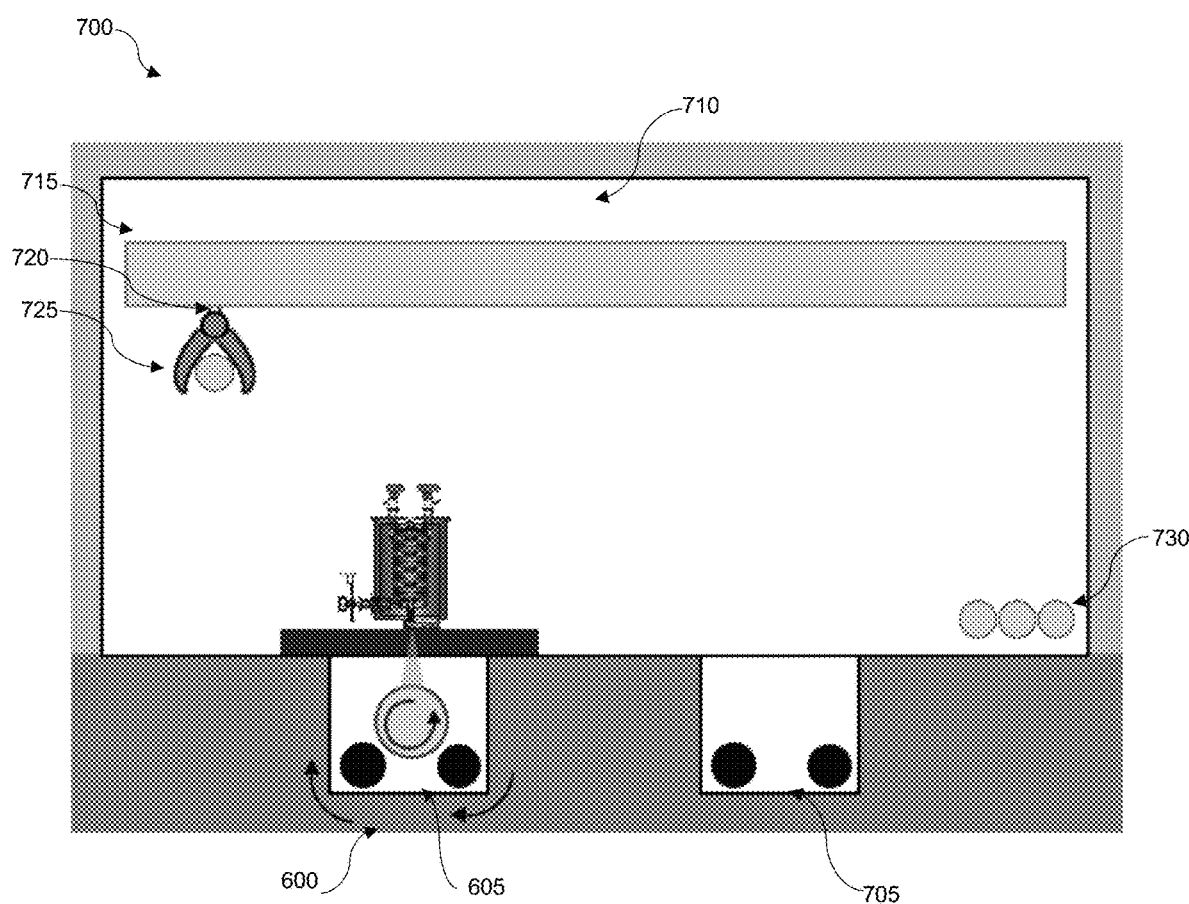
FIG. 7 illustrates a diagram of a dual bay log treatment system, in accordance with features of the disclosed embodiments.

FIG. 7 illustrates another embodiment of a dual log bay system 700 in accordance with the disclosed embodiments. In this embodiment, the treatment facility can include a first system 600, including log bay 605 and other components as illustrated in FIG. 6, and a second, substantially identical log bay 705. The log bay 705 can be configured proximate to the first log bay 605 and can include those components illustrated in FIG. 6.

The system 700 further includes a pick and place log assembly 710. The pick and place log assembly 710 can include a crane 715, with an extendable and retractable neck 720 attached to jaws 725. The jaws 725 can be specially configured to pick up logs. The crane 715 can be configured as a standard stand-alone crane, or can comprise a ceiling-mounted, crane neck with three degrees of freedom installed in a treatment facility.

In certain embodiments, the pick and place log assembly 710 can be used to pick a log from a log stack 730 and set it into one of log bay 605, or log bay 705. The shielding platform can be configured to slide between log bay 605 and log bay 705 (on rails, rollers, skids, or other such means). Thus, as a log is being treated in one log bay, the pick and place log assembly 710 can be used to insert a log for treatment into the other bay. Once treatment is complete in the active log bay, the shielding platform can be moved to the other bay and begin treatment, while the pick and place log assembly 710 can remove the treated log and place a new log for treatment in its place.

Figure 8:
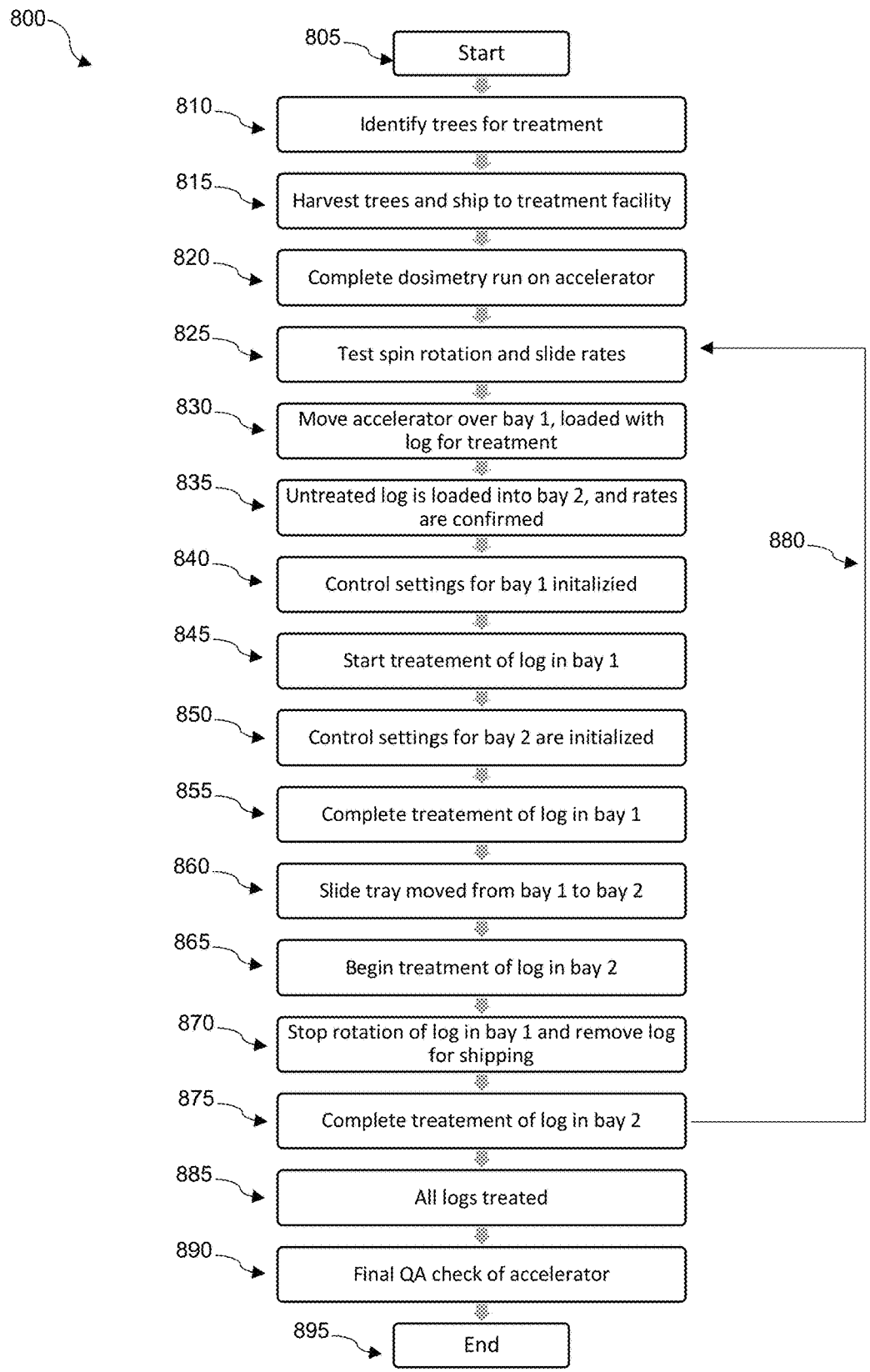
FIG. 8 illustrates a flow chart of logical operational steps associated with a method for treating lumber, in accordance with features of the disclosed embodiments.

FIG. 8 illustrates a method 800 for log treatment using the systems disclosed herein, in accordance with the disclosed embodiments. It should be appreciated that the arrangement of steps is exemplary, and that one or more of the steps may be completed in other orders, or simultaneously, in certain embodiments. The method begins at 805.

In certain embodiments, the initial step 810 includes identifying trees to harvest. In such an embodiment, it is necessary to identify trees in a quarantine zone, or that are at risk of having an infestation of invasive pests. The trees can be harvested and shipped to a treatment facility as shown at step 815. Preferably, the trees are harvested at stage 305 or 310 of the invasive pest life cycle illustrated in FIG. 3, although other harvesting times are also possible.

Next, the shielding platform and particle accelerator can be positioned over log bay 2. A QA test on the particle accelerator can be performed at 820 into empty bay 2 to ensure the accelerator is running properly with a dosimetry run.

Meanwhile, at 825, a log can be placed in bay 1 and the spinning rotation and longitudinal shielding platform rates can be confirmed. Once the QA check is completed in bay 2, the particle beam can be turned off, and the shielding platform can be moved into position over bay 1, with the log therein, as shown at step 830.

With bay 2 now empty, an untreated log can be loaded into bay 2, and spinning rotation and longitudinal rates can be confirmed at step 835.

In bay 1, control settings can be initialized at 840, for the subject log diameter and rotation speed. Treatment of the log in bay 1 can then proceed at 845, by subjecting the log to a required dose. Note the log is rotated as the shielding platform is drawn along the longitudinal axis of the log.

In bay 2, the control settings for the loaded log can be initialized to match the log diameter with rotation speed, as shown at 850. Note the log in bay 2 can thus be prepared for treatment as the log in bay 1 is being treated.

In bay 1, treatment of the first log can be completed at 855. The shielding platform can then be moved to bay 2 at 860, and treatment of the log in bay 2 can begin at 865. The rotation of the log in bay 1 can stop so that the log can be removed for shipping at 870, while the treatment is completed in bay 2 at 875.

This process can thus be repeated as shown by line 880 until all the logs are treated at step 885. At step 890, a final QA check can be performed on the accelerator at which point all of the logs are ready for shipment, and the method ends at 895.

Figure 9A:
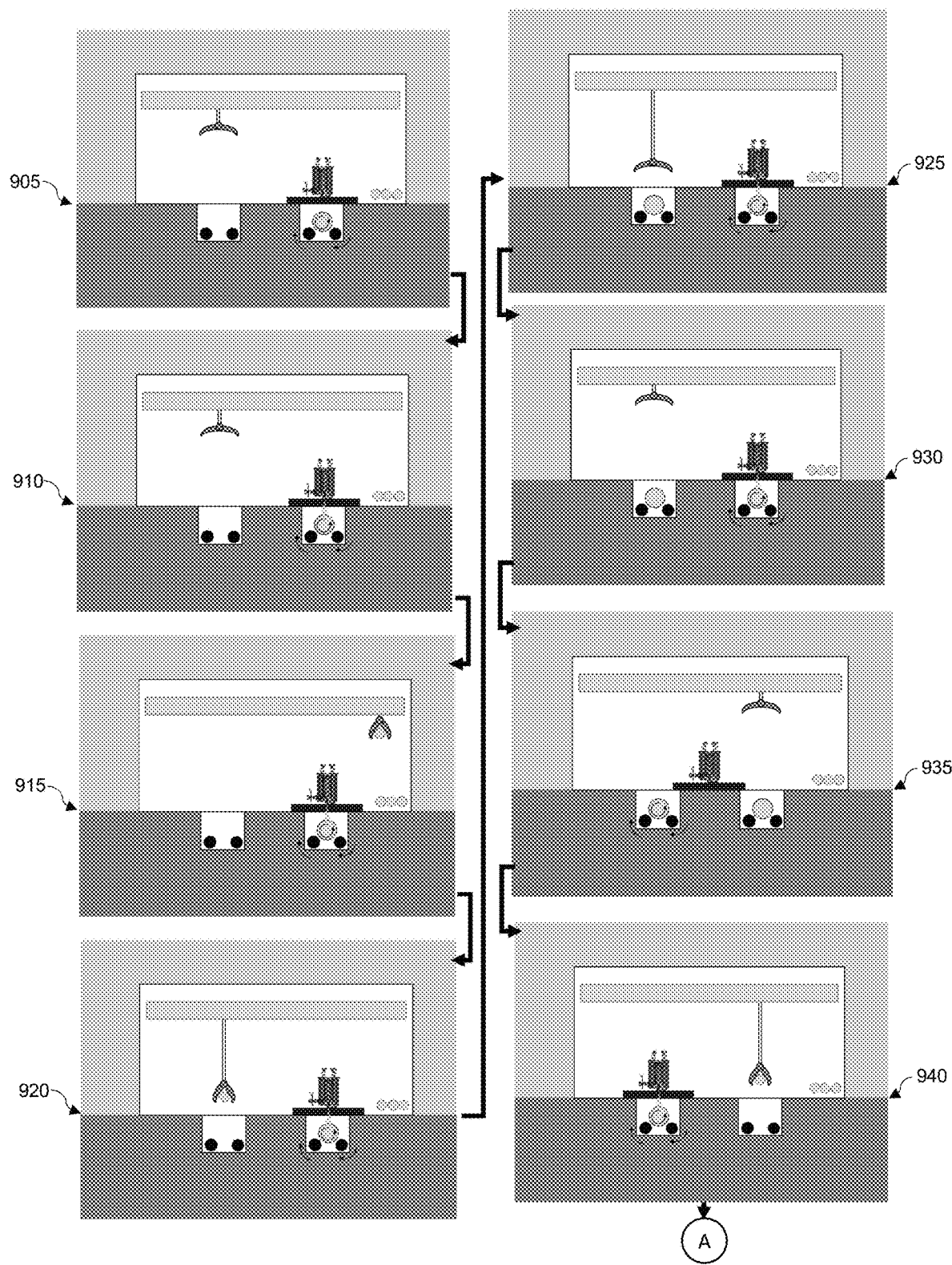
FIGS. 9A and 9B illustrate a series of diagrams illustrating steps associated with a method of for treating lumber, in accordance with features of the disclosed embodiments.
Figure 9B:
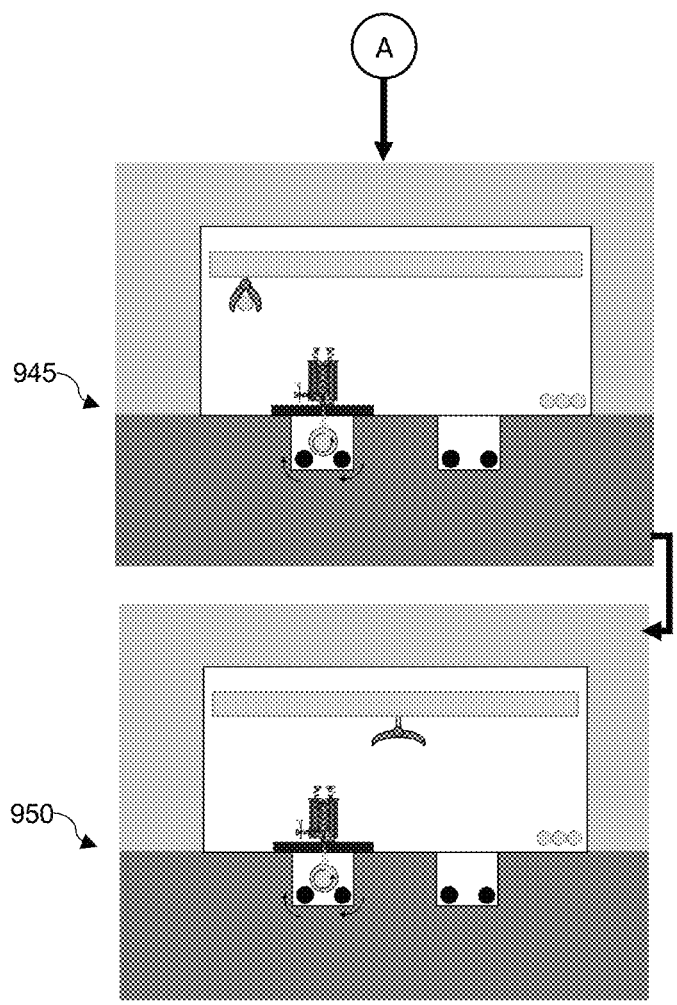

FIGS. 9A-9B graphically illustrate a two bay treatment method 900 in accordance with the disclosed embodiments. At step 905, the accelerator and shielding platform can be positioned over a spinning log in bay 1. At step 910 treatment of the log in bay 1 can begin. Meanwhile, an untreated log can be picked from the log stock at 915, lowered into bay 2 at 920, and set into place in bay 2 at step 925. The crane jaws can be retracted at step 930.

At step 935, the treatment of the log in bay 1 can be completed, the shielding platform can be moved toward bay 2, and the rotation of the log in bay 2 can be initialized. At step 940 the particle accelerator can be moved into position over the log in bay 2 and treatment of the log can begin. The treated log from bay 1 can simultaneously be removed from bay 1.

The treated log from bay 1 can be stacked with other treated product ready for distribution as shown at 945. The pick and place apparatus is then ready to collect another untreated log for placement into bay 1, as illustrated at 950, so that the process can be repeated until the entire stock of untreated lumber is treated.

Figure 10:
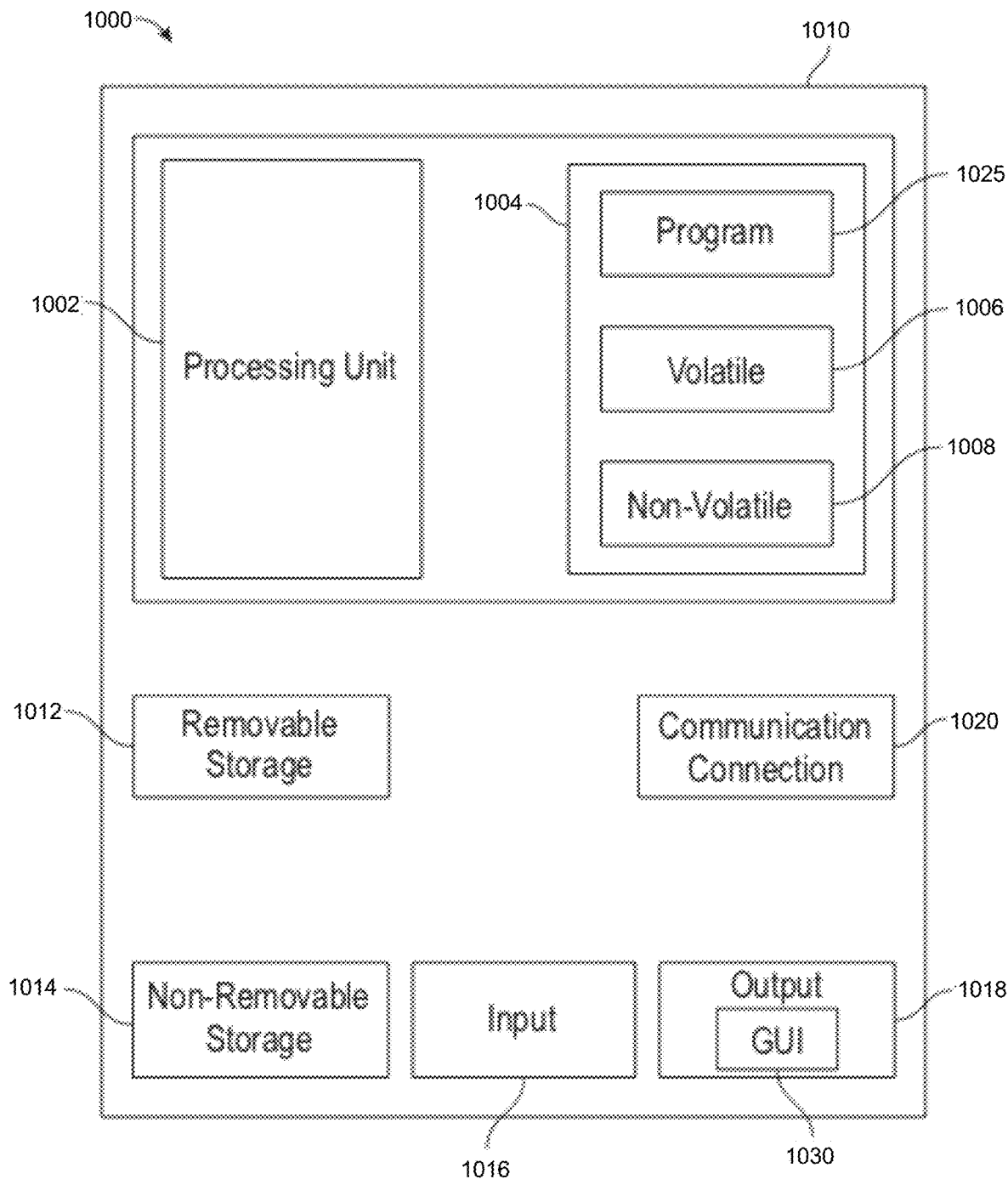
FIG. 10 depicts a block diagram of a computer system which is implemented in accordance with the disclosed embodiments.
Figure 11:
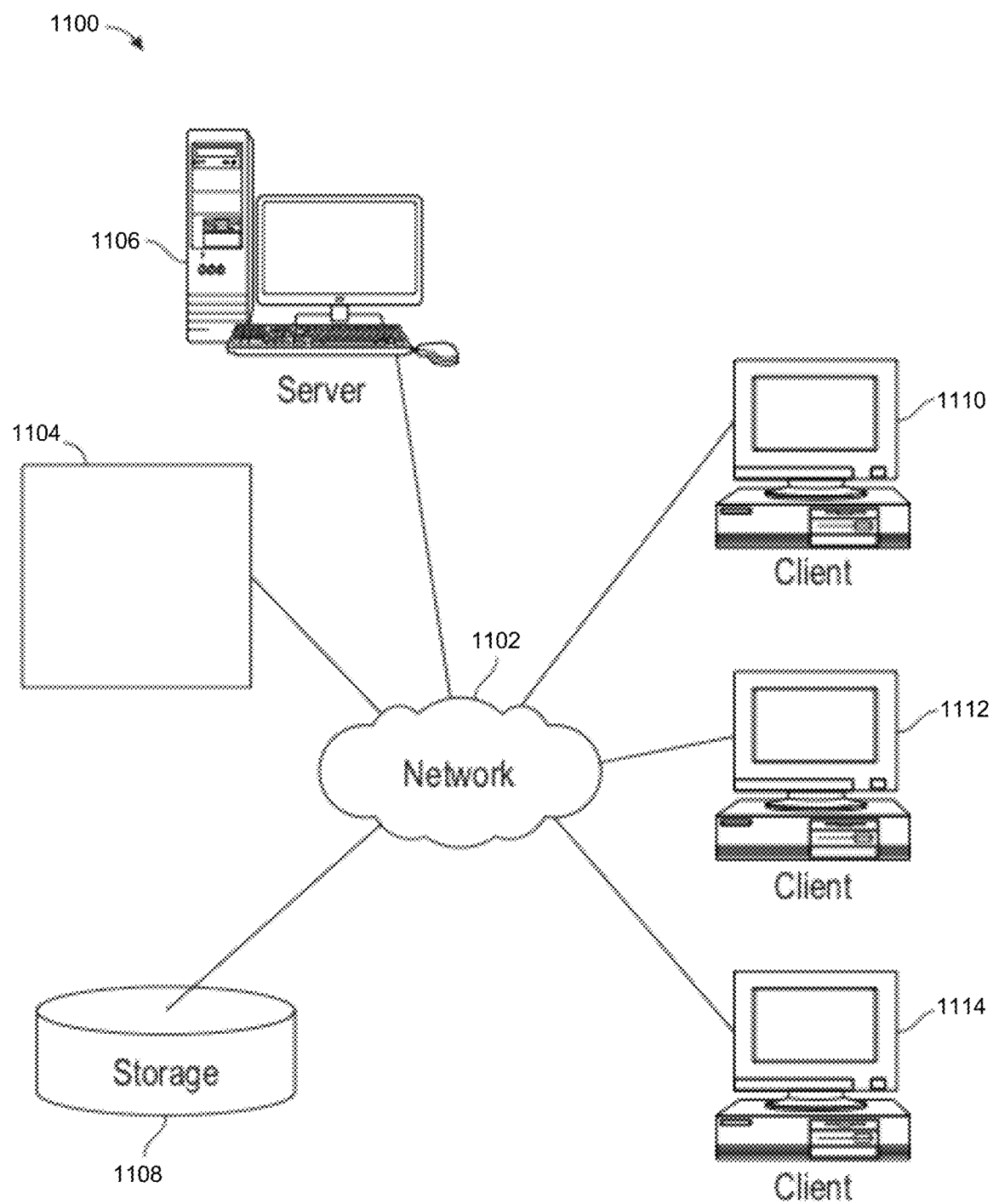
FIG. 11 depicts a graphical representation of a network of data-processing devices in which aspects of the present embodiments may be implemented.
Figure 12:
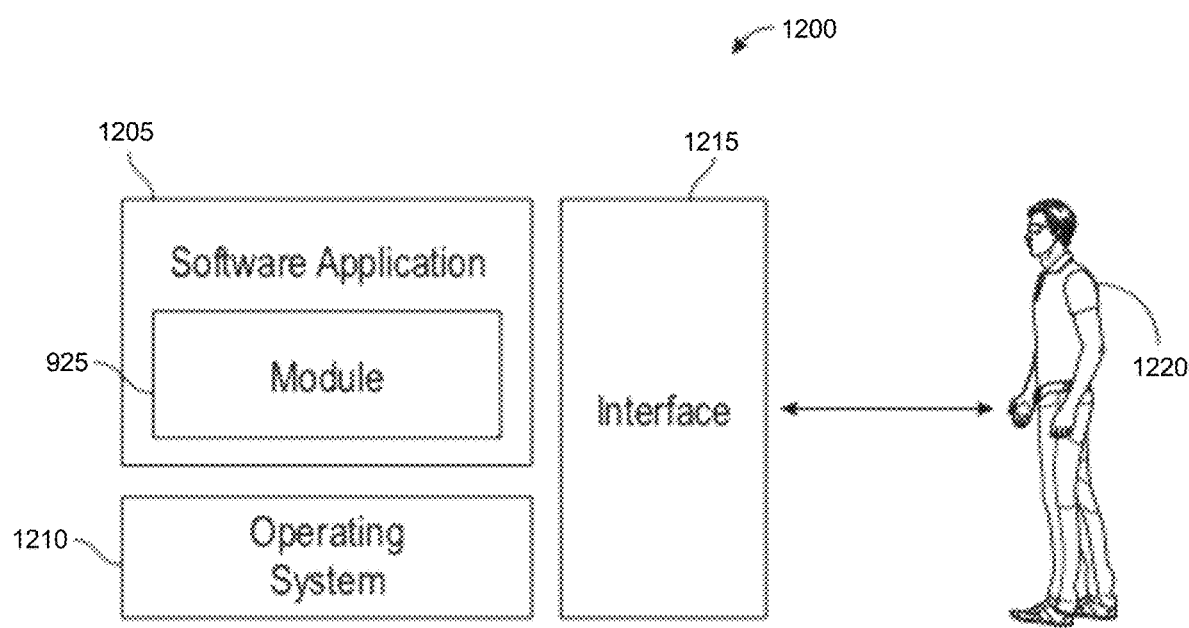
FIG. 12 depicts a computer software system for directing the operation of the data-processing system depicted in FIG. 10, in accordance with an embodiment.

FIGS. 10-12 are provided as exemplary diagrams of data-processing environments in which embodiments can be implemented. It should be appreciated that FIGS. 10-12 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 1000 that executes programming for implementing parts of the methods and systems disclosed herein is shown in FIG. 10. A computing device in the form of a computer 1010 configured to interface with sensors, peripheral devices, and other elements disclosed herein may include one or more processing units 1002, memory 1004, removable storage 1012, and non-removable storage 1014. Memory 1004 may include volatile memory 1006 and non-volatile memory 1008. Computer 1010 may include or have access to a computing environment that includes a variety of transitory and non-transitory computer-readable media such as volatile memory 1006 and non-volatile memory 1008, removable storage 1012 and non-removable storage 1014. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 1010 may include or have access to a computing environment that includes input 1016, output 1018, and a communication connection 1020. The computer may operate in a networked environment using a communication connection 1020 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 11 below.

Output 1018 is most commonly provided as a computer monitor, but may include any output device. Output 1018 and/or input 1016 may include a data collection apparatus associated with computer system 1000. In addition, input 1016, which commonly includes a computer keyboard and/or pointing device such as a computer mouse, computer track pad, or the like, allows a user to select and instruct computer system 1000. A user interface can be provided using output 1018 and input 1016. Output 1018 may function as a display for displaying data and information for a user, and for interactively displaying a graphical user interface (GUI) 1030.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 1016 such as, for example, a pointing device such as a mouse and/or with a keyboard. A particular item can function in the same manner to the user in all applications because the GUI provides standard software routines (e.g., module 1025) to handle these elements and report the user's actions. The GUI can further be used to display the electronic service image frames as discussed below.

Computer-readable instructions, for example, program module or node 1025, which can be representative of other modules or nodes described herein, are stored on a computer-readable medium and are executable by the processing unit 1002 of computer 1010. Program module or node 1025 may include a computer application. A hard drive, CD-ROM, RAM, Flash Memory, and a USB drive are just some examples of articles including a computer-readable medium.

FIG. 11 depicts a graphical representation of a network of data-processing systems 1100 in which aspects of the present invention may be implemented. Network data-processing system 1100 is a network of computers or other such devices such as mobile phones, smartphones, sensors, detection devices, controllers and the like in which embodiments of the present invention may be implemented. Note that the system 1100 can be implemented in the context of a software module such as program module 1025. The system 1100 includes a network 1102 in communication with one or more clients 1110, 1112, and 1114. Network 1102 may also be in communication with one or more devices 1104, servers 1106, and storage 1108. Network 1102 is a medium that can be used to provide communications links between various devices and computers connected together within a networked data processing system such as computer system 1000. Network 1102 may include connections such as wired communication links, wireless communication links of various types, fiber optic cables, quantum, or quantum encryption, or quantum teleportation networks, etc. Network 1102 can communicate with one or more servers 1106, one or more external devices such as a controller, actuator, particle accelerator, associated electron beam accelerator, or other such device 1104, and a memory storage unit such as, for example, memory or database 1108. It should be understood that device 1104 may be embodied as a detector device, microcontroller, controller, receiver, transceiver, or other such device.

In the depicted example, device 1104, server 1106, and clients 1110, 1112, and 1114 connect to network 1102 along with storage unit 1108. Clients 1110, 1112, and 1114 may be, for example, personal computers or network computers, handheld devices, mobile devices, tablet devices, smartphones, personal digital assistants, microcontrollers, recording devices, MFDs, etc. Computer system 1000 depicted in FIG. 10 can be, for example, a client such as client 1110 and/or 1112.

Computer system 1000 can also be implemented as a server such as server 1106, depending upon design considerations. In the depicted example, server 1106 provides data such as boot files, operating system images, applications, and application updates to clients 1110, 1112, and/or 1114. Clients 1110, 1112, and 1114 and external device 1104 are clients to server 1106 in this example. Network data-processing system 1100 may include additional servers, clients, and other devices not shown. Specifically, clients may connect to any member of a network of servers, which provide equivalent content.

In the depicted example, network data-processing system 1100 is the Internet with network 1102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 1100 may also be implemented as a number of different types of networks such as, for example, an intranet, a local area network (LAN), or a wide area network (WAN). FIGS. 10 and 11 are intended as examples and not as architectural limitations for different embodiments of the present invention.

FIG. 12 illustrates a software system 1200, which may be employed for directing the operation of the data-processing systems such as computer system 1000 depicted in FIG. 10. Software application 1205, may be stored in memory 1004, on removable storage 1012, or on non-removable storage 1014 shown in FIG. 10, and generally includes and/or is associated with a kernel or operating system 1210 and a shell or interface 1215. One or more application programs, such as module(s) or node(s) 1025, may be "loaded" (i.e., transferred from removable storage 1012 into the memory 1004)

for execution by the data-processing system 1000. The data-processing system 1000 can receive user commands and data through user interface 1215, which can include input 1016 and output 1018, accessible by a user 1220. These inputs may then be acted upon by the computer system 1000 in accordance with instructions from operating system 1210 and/or software application 1205 and any software module(s) 1025 thereof.

Generally, program modules (e.g., module 1025) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 1215 (e.g., a graphical user interface 1030) can serve to display results, whereupon a user 1220 may supply additional inputs or terminate a particular session. In some embodiments, operating system 1210 and GUI 1030 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 1210 and interface 1215. The software application 1205 can include, for example, module(s) 1025, which can include instructions for carrying out steps or logical operations such as those shown and described herein.

The description is presented with respect to embodiments of the present invention, which can be embodied in the context of, or require the use of a data-processing system such as computer system 1000, in conjunction with program module 1025, and data-processing system 1100 and network 1102 depicted in FIGS. 10-12. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation. In other embodiments, manual control of various aspects may be achievable while closely monitoring readbacks.

The disclosed irradiation device can be configured with features that can tailor the beam power, reduce the overall size, and are more energy efficient for particular electron beam applications. Current treatment processes are not suitable to maintain or improve the environmental impact via fumigation and pesticides for forests. The disclosed techniques relate to human health and environmental concerns. Invasive pests are a nuisance, and strides have been taken to handle the current status. It should be understood that the disclosed technology can expand beyond EAB infestation and can more generally be applied to any invasive pests.

Irradiation and ionizing radiation have not been widely used on a commercial scale due to the lacking characteristics that have been improved upon over the recent years. Now with these avenues of an emerging technology a new and efficient tactical biosecurity approach may be possible with the use of the disclosed embodiments.

In certain embodiments, the systems and methods disclosed herein can be adapted to include treatment of live trees. In such embodiments, an accelerator system can be mounted to a unmanned aerial vehicle, scaffold, or crane, and can be used to dose the live tree.

Based on the foregoing, it can be appreciated that a number of embodiments are disclosed herein. In an embodiment, a system for the treatment of invasive pests, can include an irradiation device for generating an electron beam that is applicable to a tree infected by an invasive pest, wherein the electron beam provides an in-situ treatment for the tree infected by the invasive pest by killing the invasive pest via electron beam irradiation.

In an embodiment, the electron beam generated by the electron beam device can comprise a 9 MeV electron beam. In an embodiment, at least one temperature sensor can track an internal temperature of at least one tree surrogate, such that a differential temperature difference tracked by the at least one temperature sensor is used to ensure that a reduction in a temperature associated with the tree is attributable to the electron beam rather than an increase in heat.

In an embodiment, the irradiation device can comprise a portable irradiation device.

In an embodiment, the irradiation device can comprise a portable electron beam accelerator.

In an embodiment, the power associated with the electron beam may be adjustable.

In an embodiment, a method for the treatment of invasive pests, can involve: generating an electron beam from an irradiation device; and applying the electron beam to a tree infected by an invasive pest, wherein the electron beam provides an in-situ treatment for the tree infected by the invasive pest by killing the invasive pest via electron beam irradiation.

In an embodiment of the method, electron beam generated by the electron beam device can comprise a 9 MeV electron beam.

In an embodiment, the method can further involve tracking an internal temperature of at least one tree surrogate with at least one temperature sensor, and determining a differential temperature difference from data tracked by the at least one temperature sensor, wherein the differential temperature difference is used to ensure that a reduction in a temperature associated with the tree is attributable to the electron beam rather than an increase in heat. In an embodiment of the method, the irradiation device can comprise a portable irradiation device.

In an embodiment of the method, the irradiation device can comprise a portable electron beam accelerator. In an embodiment of the method, the power associated with the electron beam can be adjustable.

A method for the treatment of invasive pests, comprising generating an electron beam with an irradiation device and applying the electron beam to a tree, wherein the electron beam provides an in-situ treatment for the tree. In an embodiment, the electron beam generated by the irradiation device comprises a 9 MeV electron beam. In an embodiment the method further comprises tracking an internal temperature of at least one tree surrogate with at least one temperature sensor and determining a differential temperature difference from data tracked by the at least one temperature sensor, wherein the differential temperature difference is used to ensure that a reduction in a temperature associated with the tree is attributable to the electron beam. In an embodiment, the method further comprises rotating the tree as the electron beam is applied to the tree and pulling the irradiation device along the longitudinal axis of the tree.

In an embodiment, the irradiation device comprises a portable irradiation device. The irradiation device comprises a portable electron beam accelerator. The power of the electron beam is adjustable.

In another embodiment, a system for treating pests comprises an irradiation device configured to generate a particle beam, a log bay with at least two log rollers formed in the log bay, a shielding platform configured to hold the irradiation device over the log bay, and a computer system configured to control the irradiation device and the speed of the at least two log rollers. In an embodiment, the irradiation device comprises a portable electron beam device configured to generate an electron beam. In an embodiment, an aperture in the shield platform through which the particle beam passes.

In an embodiment, the system further includes a second log bay with at least two log rollers formed in the second log bay and a pick and place log assembly configured to place logs in the log bay and the second log bay. In an embodiment, the pick and place log assembly comprises a retractable neck and jaws for securing a log.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A system for treatment of invasive pests, comprising:
   an irradiation device for generating a particle beam, the particle beam being applicable to a log;
   a log bay;
   two spinning rollers disposed in the log bay and configured to accept a log between, and in contact with, each of the two spinning rollers wherein the two spinning rollers rotate the log, wherein the particle beam provides an in-situ treatment of the log via irradiation from the particle beam;
   a shielding platform with the irradiation device mounted to the shielding platform, with the shielding platform configured over the log bay.

2. The system for treatment of invasive pests of claim 1, wherein the irradiation device comprises an electron beam irradiation device, and the particle beam comprise an electron beam.

3. The system for treatment of invasive pests of claim 2 wherein the electron beam generated by the electron beam irradiation device comprises a 9 MeV electron beam.

4. The system for treatment of invasive pests of claim 1 further comprising:
   at least one temperature sensor configured to track an internal temperature of at least one tree surrogate.

5. The system for treatment of invasive pests of claim 1 wherein the irradiation device comprises a portable irradiation device.

6. The system for treatment of invasive pests of claim 1 wherein the irradiation device comprises a portable electron beam accelerator.

7. The system for treatment of invasive pests of claim 6 wherein a power of the particle beam is adjustable in relation to rotational speed of the spinning rollers.

8. A method for treatment of invasive pests, comprising:
   generating an electron beam with an irradiation device;
   rotating a log in a log bay with two spinning rollers disposed in the log bay and, wherein the log is in contact with each of the two spinning rollers wherein the particle beam provides an in-situ treatment of the log via irradiation from the electron beam;
   applying the electron beam to the log; and
   shielding the electron beam with a shielding platform with the irradiation device mounted to the shielding platform.

9. The method for treatment of invasive pests of claim 8 wherein the electron beam generated by the irradiation device comprises a 9 MeV electron beam.

10. The method for treatment of invasive pests of claim 8 further comprising:
    tracking an internal temperature of at least one tree surrogate with at least one temperature sensor; and
    determining a differential temperature difference from data tracked by the at least one temperature sensor.

11. The method for treatment of invasive pests of claim 8 further comprising:
    moving the irradiation device along a longitudinal axis of the tree.

12. The method for treatment of invasive pests of claim 8 wherein the irradiation device comprises a portable irradiation device.

13. The method for treatment of invasive pests of claim 8 wherein the irradiation device comprises a portable electron beam accelerator.

14. The method for treatment of invasive pests of claim 8 further comprising:
    adjusting a power of the electron beam according to parameters associated with the tree, and the rotational speed of the spinning rollers.

15. A system for treating pests comprising:
    an irradiation device configured to generate a particle beam;
    a log bay with two log rollers formed in the log bay configured to accept a log between, and in contact with, each of the two log rollers;
    a shielding platform with the irradiation device mounted to the shielding platform, wherein the shielding platform is configured over the log bay; and
    a computer system configured to control the irradiation device and a rotational speed of the at least two log rollers.

16. The system for treating pests of claim 15 wherein the irradiation device comprises:
    a portable electron beam device configured to generate an electron beam.

17. The system for treating pests of claim 15 further comprising:
   an aperture in the shielding platform through which the particle beam passes.

18. The system for treating pests of claim 15 further comprising:
   a second log bay with at least two log rollers formed in the second log bay; and
   a pick and place log assembly configured to place logs in the log bay and the second log bay.

19. The system for treating pests of claim 18 wherein the pick and place log assembly comprises:
   a retractable neck; and
   jaws for securing a log.

* * * * *